Patented July 10, 1928.

1,676,700

UNITED STATES PATENT OFFICE.

WARREN K. LEWIS, OF NEWTON, MASSACHUSETTS, ASSIGNOR TO STANDARD OIL DEVELOPMENT COMPANY, A CORPORATION OF DELAWARE.

DEHYDRATING ALCOHOL AND THE LIKE.

No Drawing.   Application filed August 16, 1922. Serial No. 582,136.

This invention relates to the isolation of the constituents of composite liquids that form mixtures of constant boiling point. The pure components cannot be obtained from such mixtures by simple distillation, no matter how efficient the rectification may be. The best that can be done according to priod methods is to obtain the constant boiling mixture and one of the pure components. This situation is encountered industrially in the manufacture of various liquid products, notably absolute ethyl alcohol. In the case of aqueous alcoholic liquids, the constant boiling point or azeotropic mixture produced at atmospheric pressure contains about 95.6% alcohol, the remainder being water, according to prior practice. It is possible to raise the percentage of alcohol by conducting the distillation under reduced pressure. From the commercial standpoint, however, it is entirely impracticable to make any single pressure adjustment which will enable the distiller to completely remove water from his product.

In accordance with the present invention, the pure components of azeotropic mixtures are obtained by subjecting the liquid to successive distillations under properly regulated pressure conditions. The invention will be made clear by reference to treatment of composite liquids forming an azeotropic mixture of minimum boiling point, such as aqueous alcoholic liquids. Mixtures of other characteristics may, however, be treated with advantage, according to the principles of the present method. Briefly, this consists in distilling an aqueous liquid containing alcohol under reduced pressure to obtain a distillate having more than about 95.6% alcohol, and then subjecting this distillate to distillation under atmospheric or superatmospheric pressure. Water is removed in the distillate from the latter operation and absolute alcohol is drawn off from the bottom of the still.

In the case of separating water from alcohols, the aqueous alcohol, for example ethyl alcohol, is heated in a still equipped with a fractionating column, for instance of the bubble plate type, and the feed being conducted into the column, distillation is carried on while an absolute pressure corresponding to 6 inches or less of mercury is maintained in the still and column. An alcohol of about 98% is taken off as condensate. This is picked up by a pump and fed into the fractionating column of another still, which is maintained under a pressure of 100 lbs. or more per square inch. Under this condition, the alcohol becomes more and more concentrated down the tower and is drawn off at the bottom substantially water-free, while the water is gradually worked off up the tower, a mixture containing about 92% alcohol, in one instance, being taken off at the top of the tower and returned to discharge on the appropriate plate of the tower of the first (vacuum) still. From the bottom of the vacuum still, water is drained off.

Alcohols in very dilute form may be taken as starting material, where desired.

In some cases, distillation may be conducted under pressure and then under absence of pressure (sub-atmospheric pressure), and where the feed stock is of suitable composition, fractionating under pressure only is sufficient; and in its broadest aspects my invention contemplates controlling in general the distillation conditions with reference to the composition of the feed stock, so as to avoid with mixtures which would normally tend to form constant boiling mixtures, conditions where the relative composition of the vapors evolved would be the same as that of the boiling liquid; or, more explicitly in the case of an alcohol in aqueous admixture, maintaining the conditions such that the feed will be on either side of the constant boiling mixture, or will be richer in alcohol than the constant boiling mixture for the conditions selected.

While in describing my invention, I have referred to ethyl alcohol in particular and certain specific examples of detail, it will be understood that these are illustrative and in no sense limitative, and the invention applies to the various alcohols and water, and to liquid mixtures of constant boiling tendency whose conditions may be thus varied. Nor is the invention to be understood as dependent upon the accuracy of any theory or reasons suggested to explain the advantageous results. On the contrary, the invention is to be regarded as limited only as defined in the following claims, in which it is my intention to claim all inherent novelty as broadly as the prior art permits.

What I claim is:

1. Process of concentrating aqueous solutions of ethyl alcohol, comprising fractionally distilling an aqueous solution containing less than 95.6% alcohol under an absolute pressure corresponding to not more than six inches of mercury, taking off a distillate containing more than 95.6% alcohol, fractionally distilling such distillate under a pressure of at least 100 pounds per square inch, so as to leave a substantially anhydrous residue and obtain a distillate containing less than 95.6% alcohol.

2. Process according to claim 1, in which the distillate containing less than 95.6% alcohol is passed to the solution being distilled at the lower pressure.

3. Process of concentrating aqueous solutions of ethyl alcohol, which comprises fractionally distilling under sub-atmospheric pressure an aqueous solution containing less than the proportion of alcohol existing in the constant boiling mixture of the same at atmospheric pressure, taking off a distillate containing a greater proportion of alcohol than that in such constant boiling mixture, and fractionally distilling such distillate at a superatmospheric pressure so as to obtain anhydrous alcohol as a residue.

4. Process of concentrating aqueous solutions of an alcohol that forms with water a constant boiling mixture of minimum boiling point, comprising distilling at a pressure less than atmospheric an aqueous solution of such alcohol containing less than the proportion of alcohol in the constant boiling mixture at atmospheric pressure, taking off a distillate containing a greater proportion of alcohol than in such constant boiling mixture at atmospheric pressure, and distilling the distillate at a pressure greater than the pressure at which the first mentioned distillation takes place, so as to leave absolute alcohol as a residue.

5. In a process of separating a component from a composite liquid characterized by the formation of constant boiling mixtures, the improvement which comprises distilling the liquid at any certain pressure so as to separate a constant boiling mixture having a higher content of said component than is present in the mixture which has a constant boiling point at atmospheric pressure, and distilling the separated constant boiling mixture at a pressure materially different from that first mentioned so as to separate a product enriched in said component.

6. In a process of separating a component from a composite liquid characterized by the formation of constant boiling mixtures, the improvement which comprises distilling the liquid at any certain pressure so as to separate a constant boiling mixture having a higher content of said component than is present in the mixture which has a constant boiling point at atmospheric pressure, and distilling the separated constant boiling mixture at a pressure materially different from that first mentioned so as to separate a constant boiling mixture and a product enriched in said component, and returning the constant boiling mixture obtained from the second distillation to the first liquid being distilled.

WARREN K. LEWIS.